US008799715B2

(12) United States Patent
Gulati et al.

(10) Patent No.: US 8,799,715 B2
(45) Date of Patent: Aug. 5, 2014

(54) SYSTEM ON A CHIP (SOC) DEBUG CONTROLLABILITY

(75) Inventors: Manu Gulati, Saratoga, CA (US);
James D. Ramsay, San Jose, CA (US);
Erik P. Machnicki, San Jose, CA (US);
Jianlin Yu, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 184 days.

(21) Appl. No.: 13/533,295

(22) Filed: Jun. 26, 2012

(65) Prior Publication Data

US 2013/0346800 A1 Dec. 26, 2013

(51) Int. Cl.
*G06F 11/00* (2006.01)

(52) U.S. Cl.
USPC .............................. 714/34; 714/30

(58) Field of Classification Search
CPC ............ G06F 11/3466; G06F 11/348; G06F 11/3656; G06F 11/3664; G01R 31/31705; G01R 31/318533
USPC .......................... 714/30, 34, 47.1
See application file for complete search history.

(56) References Cited

U.S. PATENT DOCUMENTS

| | | | |
|---|---|---|---|
| 5,355,468 A * | 10/1994 | Jeppesen et al. | 714/34 |
| 6,567,933 B1 * | 5/2003 | Swoboda et al. | 714/31 |
| 6,857,084 B1 * | 2/2005 | Giles | 714/35 |
| 6,948,098 B2 * | 9/2005 | Pillay et al. | 714/34 |
| 7,080,283 B1 * | 7/2006 | Songer et al. | 714/30 |
| 7,627,771 B2 * | 12/2009 | Chelstrom et al. | 713/400 |
| 7,676,712 B2 * | 3/2010 | Bensinger et al. | 714/724 |
| 8,635,497 B2 * | 1/2014 | Miller et al. | 714/30 |
| 8,656,221 B2 * | 2/2014 | Sixsou et al. | 714/34 |
| 2003/0100133 A1 * | 5/2003 | Eidson et al. | 438/16 |
| 2005/0149892 A1 * | 7/2005 | Yee | 716/4 |
| 2005/0193254 A1 * | 9/2005 | Yee | 714/30 |
| 2008/0215923 A1 * | 9/2008 | Bueti et al. | 714/39 |
| 2012/0151263 A1 * | 6/2012 | Rentschler et al. | 714/30 |
| 2013/0159775 A1 * | 6/2013 | Balkan et al. | 714/34 |
| 2014/0013421 A1 * | 1/2014 | Hopkins et al. | 726/17 |

OTHER PUBLICATIONS

Kees Goossens et al, "Transaction-Based Communication-Centric Debug" pp. 1-12, 2007.
Miron Abramovici et al, "A Reconfigurable Design-For-Debug Infrastructure for SoCs" DAFCA, Inc. DAC 2006, Jul. 24-28, 2006 San Francisco, California, USA, pp. 1-6.
A. Mayer, et al "Debug Support, Calibration and Emulation for Multiple Processor and Powertrain Control SoCs" Proceedings of the Design, Automation and Test in Europe Conference and Exhibition 2005, pp. 1-5.
K.D. Maier, "On-Chip Debug Support for Embedded Systems-on-Chip" 2003 pp. 1-4.

* cited by examiner

*Primary Examiner* — Marc Duncan
(74) *Attorney, Agent, or Firm* — Lawrence J. Merkel; Meyertons, Hood, Kivlin, Kowert & Goetzel, P.C.

(57) ABSTRACT

In one embodiment, an SOC includes multiple components including a CPU complex and one or more non-CPU components such as peripheral interface controllers, memory controllers, media components, etc. The SOC also includes an SOC debug control unit, which is coupled to receive detected debug events from the components. Each component may include a local debug control unit that is configured to monitor for various debug events within that component. The debug events may be specific to the component. The local debug control units may transmit detected events to the SOC debug control unit. The SOC debug control unit may detect one or more events from one or more components, and may halt the components of the SOC responsive to detecting the selected events.

28 Claims, 9 Drawing Sheets

SYSTEM ON A CHIP (SOC) DEBUG CONTROLLABILITY

BACKGROUND

1. Field of the Invention

This invention is related to the field of integrated circuits such as systems on a chip (SOCs) and, more particularly, to debug features of SOCs.

2. Description of the Related Art

As the number of transistors that can be integrated onto a single integrated circuit (IC) "chip" continues to increase, the amount of functionality and complexity that can be included increases as well. SOCs are one way in which the additional functionality/complexity is employed, by integrating various peripheral functionality onto the IC with one or more processors that are the central processing unit (CPU) of the system. The peripheral functionality can include processors as well (e.g. embedded processors, microcontrollers, digital signal processors, graphics processors, etc.), and can include fixed function circuitry such as peripheral interface controllers, encoders and decoders, graphics processing hardware, audio processing hardware, memory controllers, etc.

The continued integration of functionality/complexity into an SOC leads to complications for debugging. Both hardware problems and software problems can result in errant or unexpected operation, and typically the system engineer/software engineer needs to analyze various system state to identify the problem and how to fix it or work around it. CPUs generally include various debugging features (e.g. breakpoints on certain instructions or fetch addresses, address monitoring for data accesses, single step instruction execution modes, etc.). The CPU halt features, which are tied to the concept of a centralized, synchronous execution pipeline and execution of instructions, do not naturally extend to other components that have no notion of pipelining or instruction execution, and which run asynchronously with the CPUs and other blocks.

SUMMARY

In one embodiment, an SOC includes multiple components including a CPU complex and one or more non-CPU components such as peripheral interface controllers, memory controllers, media components, etc. The SOC also includes an SOC debug control unit, which is coupled to receive detected debug events from the components. Each component may include a local debug control unit that is configured to monitor for various debug events within that component. The debug events may be specific to the component: different components may support different events based on the functionality implemented in that component. The local debug control units may be programmable to enable events to be detected, and may transmit the detected events to the SOC debug control unit. The SOC debug control unit may be programmable to detect one or more events from one or more components, and may halt the components of the SOC responsive to detecting the selected events. The state of the SOC may be observable (e.g. scanned out) and, in some embodiments, controllable (e.g. modified state may be scanned in). An engineer debugging the SOC and/or software executing on the SOC may thus have enhanced visibility and control of the system. In some embodiments, an SOC may not include a CPU complex, but may include the remaining components mentioned above.

In some embodiments, an event detected in one local debug control unit may be used as a trigger to begin monitoring for another event in another local debug control unit. Additional flexibility in identifying a desired system state at which to halt may thus be realized, in some embodiments. In an embodiment, the SOC debug control unit may support a programmable delay after identifying a specified event or combination of events, prior to halting the SOC. The delay may allow for additional operation to occur, and over multiple executions the state at various points following the event may be determined. Fine granularity debugging may thus be possible in some embodiments. In some embodiments, the state of the SOC may be scanned out, modified, and scanned back in. The modification of the state may allow for testing of bug theories, workarounds, etc.

BRIEF DESCRIPTION OF THE DRAWINGS

The following detailed description makes reference to the accompanying drawings, which are now briefly described.

Figure 1:
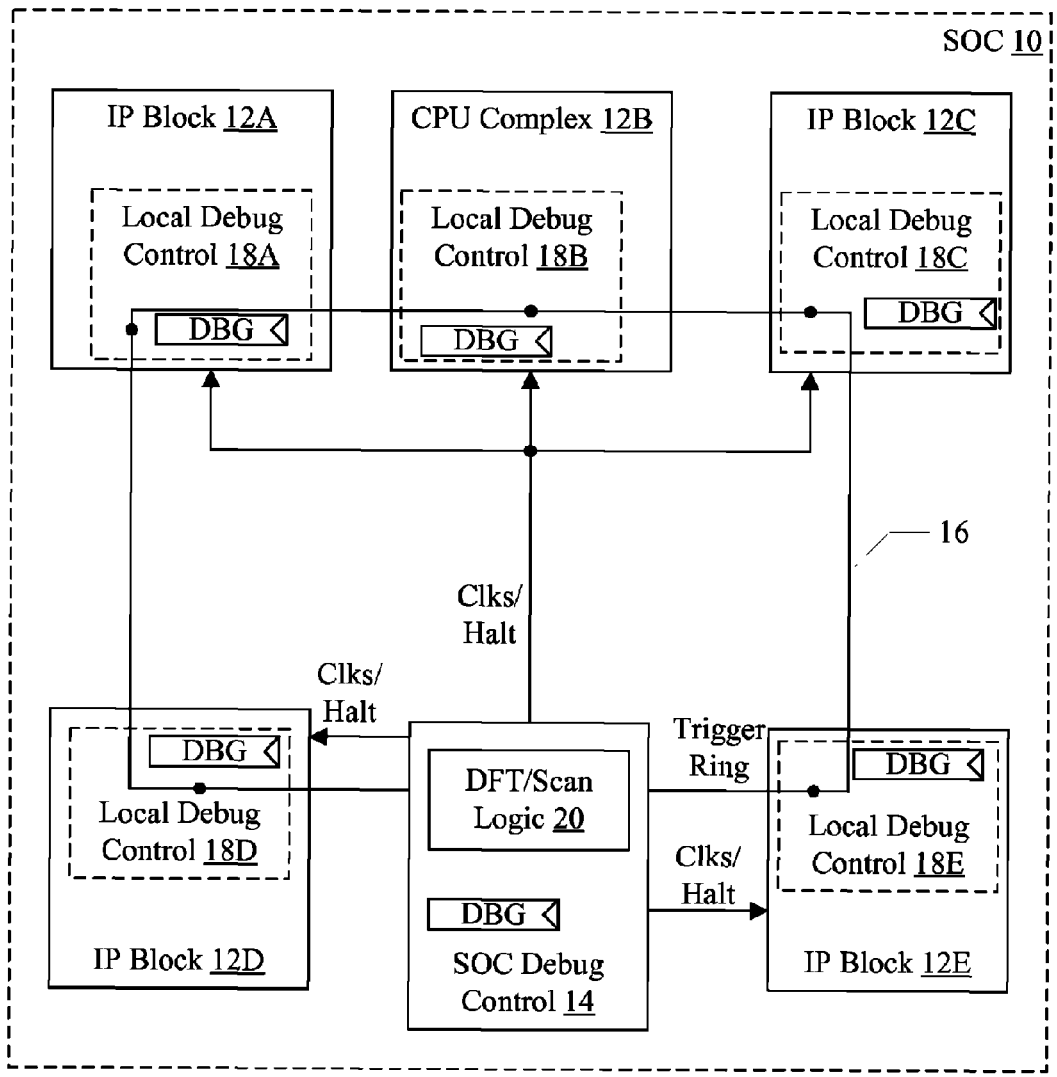
FIG. 1 is a block diagram of one embodiment of an SOC.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include", "including", and "includes" mean including, but not limited to.

Various units, circuits, or other components may be described as "configured to" perform a task or tasks. In such contexts, "configured to" is a broad recitation of structure generally meaning "having circuitry that" performs the task or tasks during operation. As such, the unit/circuit/component can be configured to perform the task even when the unit/circuit/component is not currently on. In general, the circuitry that forms the structure corresponding to "configured to" may include hardware circuits to implement the operation. Similarly, various units/circuits/components may be described as performing a task or tasks, for convenience in the description. Such descriptions should be interpreted as including the phrase "configured to." Reciting a unit/circuit/component that is configured to perform one or more tasks is expressly intended not to invoke 35 U.S.C. §112, paragraph six interpretation for that unit/circuit/component.

DETAILED DESCRIPTION OF EMBODIMENTS

Turning now to FIG. 1, a block diagram of one embodiment of an SOC 10 is shown. In the illustrated embodiment, the SOC 10 includes various intellectual property (IP) blocks 12A-12E, including a CPU complex 12B, and an SOC debug control unit 14. The IP blocks 12A-12E are coupled to the SOC debug control unit 14. More particularly, in the illustrated embodiment, the SOC debug control unit 14 and the IP blocks 12A-12E are coupled via a trigger ring 16. Additionally, the SOC debug control unit 14 may be coupled to provide clocks and/or halt controls to each of the IP blocks 12A-12E. As implied in the name "SOC", the IP blocks 12A-12E and the SOC debug control unit 14 may be integrated together on a single semiconductor substrate as a single integrated circuit. It is noted that, while an example SOC 10 is described herein that includes the CPU complex 12B, other embodiments may not include a CPU complex.

In the illustrated embodiment, each IP block 12A-12E includes a local debug control unit 18A-18E coupled to the trigger ring 16. Each local debug control unit 18A-18E may be programmable, via a register (labeled DBG within the respective debug control unit 18A-18E), to monitor for debug events within the corresponding IP block 12A-12E. The IP blocks 12A-12E may differ from each other, and thus different events may be monitored in the different IP blocks. The local debug control unit 18A-18E may be programmable to enable a subset of the possible debug events for the corresponding IP block 12A-12E. The local debug control unit 18A-18E may also be programmable to transmit a signal indicating detection of the event on the trigger ring 16. In some embodiments, the local debug control unit 18A-18E may be programmable to receive an input from the trigger ring 16 and to enable monitoring for an event responsive to assertion of the input. Thus, the detection of an event in one IP block 12A-12E may cause monitoring for an event in another IP block 12A-12E, in such embodiments.

In general, a debug event may be any event within a block that may be a trigger for locating a point in time during processing by the SOC 10, for stopping the SOC 10. In the case of a processor, a debug event may be any of the debug events supported by processors (e.g. breakpoints, address matches, etc.). For a memory controller, an address match may also be an event. Other examples of possible events may include completion or initiation of an operation that the IP block is designed to perform, clock frequency changes, power state changes, errors, etc.

The SOC debug control unit 14 may similarly be programmable to monitor for detected events from the trigger ring 16 and to halt the SOC 10 in response to the detected, enabled events. The SOC debug control unit 14 may be programmable to monitor for a combination of events, and to halt the SOC when the combination is detected. In an embodiment, the SOC debug control unit 14 may be configured to detect an event or combination of events and to delay for a programmable period of time (e.g. a number of clock cycles) before halting the SOC 10.

The SOC debug control unit 14 may be configured to halt the SOC 10 using a variety of mechanisms. Generally, halting the SOC may refer to stopping the further processing in the IP blocks 12A-12E, while retaining the current state of the blocks for possible observation/analysis. In one embodiment, the SOC debug control unit 14 may be configured to halt the SOC 10 by stopping the clocks. For example, in the illustrated embodiment, the SOC debug control unit 14 may include design for test (DFT)/scan logic control circuit 20. The DFT/scan logic control circuit 20 may implement DFT test functions, which may include stopping and starting clocks and scanning data into/out of clocked storage devices in the SOC 10 such as registers, latches, flops, arrays, etc. The SOC debug control unit 14 may be configured to use the DFT/scan logic control circuit 20 to stop the clocks. Alternatively, one or more IP blocks 12A-12E may include halt inputs that may be asserted to halt the blocks. In yet another embodiment, leaf level clock gating or hierarchical clock gating may be implemented and the clock gaters may be used to stop the clocks.

In addition to halting the SOC 10, other debug actions may be taken in response to detecting events, in some embodiments. As mentioned above, events may trigger monitoring for other events. Additionally, an event may enable another debug feature. For example, some embodiments may implement tracing of transactions transmitted on various interconnect within the SOC 10. Detection of an event may enable tracing. Similarly, the CPUs may support various CPU-centric debug features (breakpoints, single step mode, etc.), and detection of an event may enable such a debug feature. Other IP blocks 12A-12E may support debug features that are optimized for the functions implemented by those blocks, and such debug features may be enabled responsive to a detected event. Detection of an event may also disable such debug features in various IP blocks 12A-12E and/or may cause monitoring for another event to stop.

The DFT/scan logic control circuit 20 may also be used to scan state into and out of IP blocks 12A-12E for debugging. There may be one or more scan chains in each IP block 12A-12E, coupled to the DFT/scan logic 20 (scan chains not shown in FIG. 1), to permit scanning in and out of each block. In addition to scanning of clocked storage devices such as flops, registers, latches, etc., some embodiments may support shifting data into/out of memory arrays in the SOC 10 (e.g. caches and other arrays used within the SOC 10).

The IP blocks 12A-12E may each implement one or more operational features of the SOC 10. An operational feature may be a feature implemented by the SOC 10 to support the functional requirements of the SOC 10. For example, an IP block may be a peripheral interface unit such as a Universal Serial Bus (USB) or Peripheral Component Interconnect (PCI) interface (e.g. PCI Express (PCIe)). Other interfaces such as serial or parallel interface, other standard interfaces, network interfaces, etc. may be supported as well. An IP block may be networking hardware such as a media access control (MAC) circuit or a network interface circuit. An IP block may be system hardware such as a memory controller, a cache unit, a direct memory access (DMA controller), or communication fabric circuitry. An IP block may be video processing hardware such as a graphics unit, a graphics processing unit (GPU), a video encoder or decoder, a image signal processor, or a digital signal processor. An IP block may be audio processing hardware. IP blocks may be designed by the designer of the SOC 10 and/or may be purchased from a third party vendor and included in the design database used to fabricate the SOC 10. IP blocks may also be referred to as component blocks, or components.

The CPU complex 12B is also an example of an IP block. Generally, the CPU complex 12B may include one or more processors that serve as the CPU of the SOC 10. The CPU of the system includes the processor(s) that execute the main control software of the system, such as an operating system. Generally, software executed by the CPU during use may control the other components of the system to realize the desired functionality of the system. The processors may also execute other software, such as application programs. The CPU complex may further include other hardware such as a level 2 cache and/or interface to the other components of the system.

It is noted that, while each of the IP blocks 12A-12E shown in FIG. 1 includes a local debug control unit 18A-18E, it is contemplated that some IP blocks may not include local debug control units. For example, an IP block that does not generate events that are deemed interesting for debug may not include a local debug control unit. Simple IP blocks, or IP blocks that are purchased from a third party supplier may not include local debug control units.

It is noted that, while a trigger ring 16 is used to interconnect the local debug control units 18A-18E and the SOC debug control unit 14 in the embodiment of FIG. 1, other embodiments may implement other connections (e.g. direct connections from each local debug control unit 18A-18E to the SOC debug control unit 14). It is further noted that the number of IP blocks 12A-12E may vary in various embodiments, and may be more or fewer than the number shown in FIG. 1.

Figure 2:
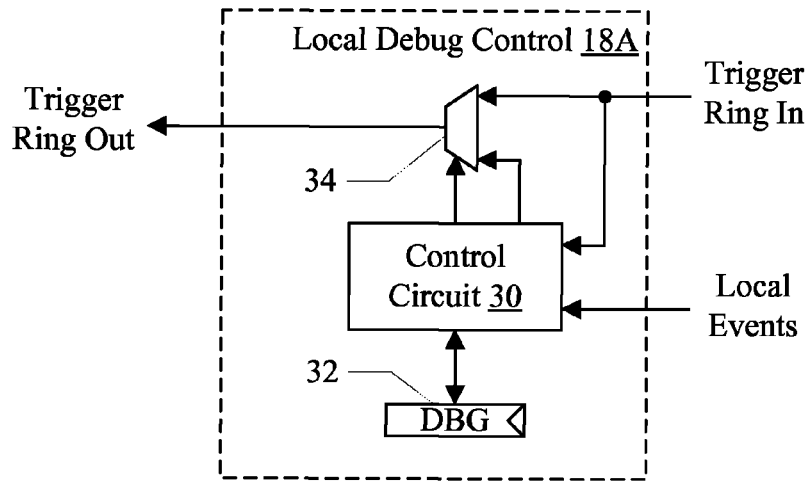
FIG. 2 is a block diagram of one embodiment of a local debug control unit shown in FIG. 1.

Turning now to FIG. 2, a block diagram of one embodiment of a local debug control unit 18A is shown. Other local debug control units 18B-18E may be similar. In the illustrated embodiment, the local debug control unit 18A includes a control circuit 30 coupled to a debug control register 32 and a multiplexor (mux) 34. The control circuit 30 is coupled to receive local events from the circuitry within the IP block 12A, and the input trigger ring signals as well. The control circuit 30 is coupled to provide inputs and selection controls to the mux 34, which is also coupled to receive the trigger ring inputs. The output of the mux 34 is the trigger ring output to the next local debug control unit in the trigger ring 16 (e.g. the local debug control unit 18D, in the embodiment of FIG. 1, for the local debug control unit 18A).

The local debug control unit 18A may be configured to monitor for various local events in the IP block 12A, and to transmit an indication of detected events on the trigger ring. More particularly, in the illustrated embodiment, the debug control register 32 may be programmed to enable one or more possible events and to assign enabled events to one of the trigger ring outputs. The control circuit 30 may be configured to monitor the enabled events, and may output an indication of the detected event to the mux 34. The mux 34 may be configured to select the indication for transmission on the trigger ring outputs responsive to a selection control from the control circuit 30.

In one embodiment, the trigger ring 16 may include multiple channels, each of which may be assigned to carry a debug indication from a local debug control unit 18A-18E to another local debug control unit 18A-18E and/or the SOC debug control unit 14. Each channel may include a signal (e.g. asserted to indicate a detected event, or deasserted to indicate no event detected). Alternatively, the channel may be a multi-bit indication that transmits an identifier of an event. Any number of channels may be supported in various embodiments on the trigger ring 16. The mux 34 may be configured to pass through the trigger ring inputs to the trigger ring outputs on channels other than channels that have been assigned to the local debug control unit 18A (under the selection controls from the control circuit 30). For those channels assigned to the local debug control unit 18A, the mux 34 may output the signals from the control circuit 30 (again, under the selection controls from the control circuit 30). Each channel may include one or more conductors to carry the signals around the trigger ring 16.

The local events may be any debug events that the IP block 12A supports. The supported events may be dependent on the operational features implemented by the IP block 12A. For example, if the IP block 12A includes a processor, various debug events supported by the processor may be local events (e.g. breakpoints, debug address matches, single step stops, etc.). If the IP block 12A includes non-processor blocks, the debug events may include other events such as frequency or power supply voltage changes, power gating or clock gating events, the initiation or completion of processing in the IP block 12A according to the operational features implemented in the IP block 12A, error detection, etc.

In some embodiments, the control circuit 30 may be programmable (via the debug register 32) to receive an input from the trigger ring and to use the input as a trigger to begin monitoring for a local event. Such functionality may permit a frequently-occurring local event to be more useful for debug, in some embodiments, by linking an occurrence of the frequently-occurring event to another event. For example, the input event may be the result of the expiration of a timer in another IP block. The input event may be the occurrence of an event in another IP block that the debugging engineer believes is linked to the bug that is occurring (along with the frequently-occurring event). The control circuit 30 may thus be coupled to receive the input trigger ring channels. Responsive to a debug indication on a specified channel, the control circuit 30 may be configured to monitor for a corresponding local debug event. In an embodiment, the control circuit 30 may be programmed to monitor in input trigger ring channel and to output a corresponding detected event on the same trigger ring channel, thus conserving other channels for other events. Such an arrangement may be used if the input trigger event is not used by the SOC debug control unit 14 or other local debug control units 12B-12E, for example.

Figure 11:
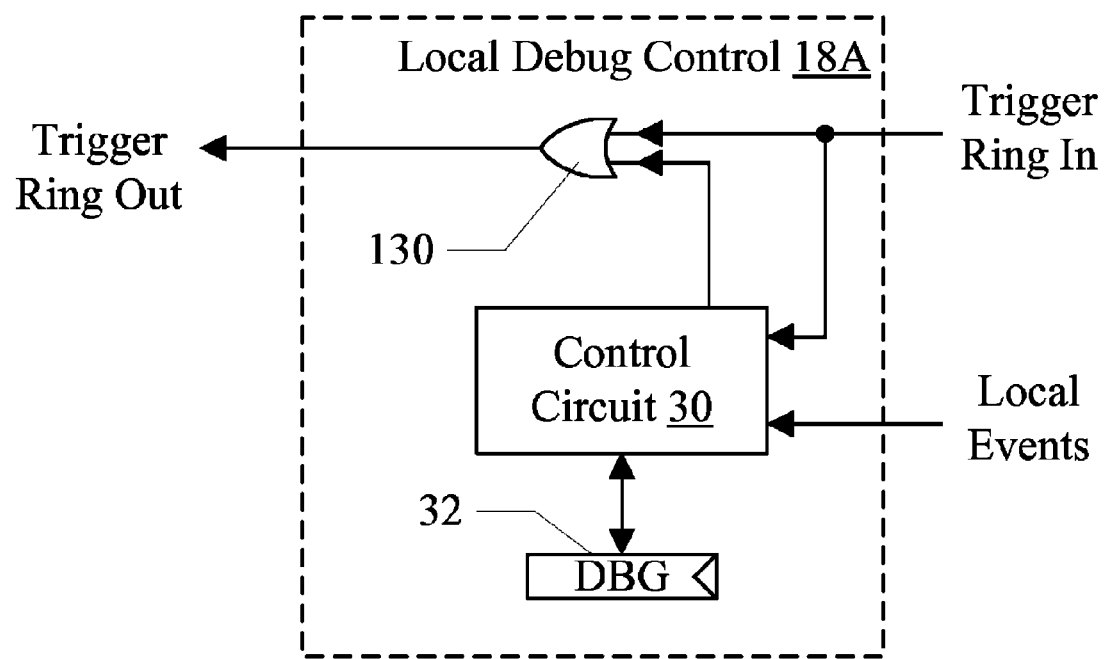
FIG. 11 is a block diagram of another embodiment of the local debug control unit shown in FIG. 1

FIG. 11 is a block diagram of another embodiment of the local debug control unit 18A. Other local debug control units 18B-18E may be similar. In the illustrated embodiment, the local debug control unit 18A includes the control circuit 30 coupled to the debug control register 32, similar to the embodiment of FIG. 2. Instead of the mux 34, however, the embodiment of FIG. 11 may include an OR gate 130 coupled to the control circuit 30. Similar to the embodiment of FIG. 2, the control circuit 30 is coupled to receive local events from the circuitry within the IP block 12A, and the input trigger ring signals as well. The control circuit 30 is coupled to provide to the OR gate 130, which is also coupled to receive the trigger ring inputs. The output of the OR gate 130 is the trigger ring output to the next local debug control unit in the trigger ring 16 (e.g. the local debug control unit 18D, in the embodiment of FIG. 1, for the local debug control unit 18A).

In the embodiment of FIG. 11, the OR gate 130 may represent the logical ORing of trigger ring inputs with the enabled local events from the control circuit 30. The logical ORing may be on a channel-by-channel basis, in embodiments in which the trigger ring has multiple channels. It may be the responsibility of software programming the DBG registers 32 in the various local debug control units 18A-18E and the SOC debug control unit 14 to ensure that events do not overlap on a given channel or, if events do overlap on a given channel, that the overlap is sensible for the debug being performed.

Figure 3:
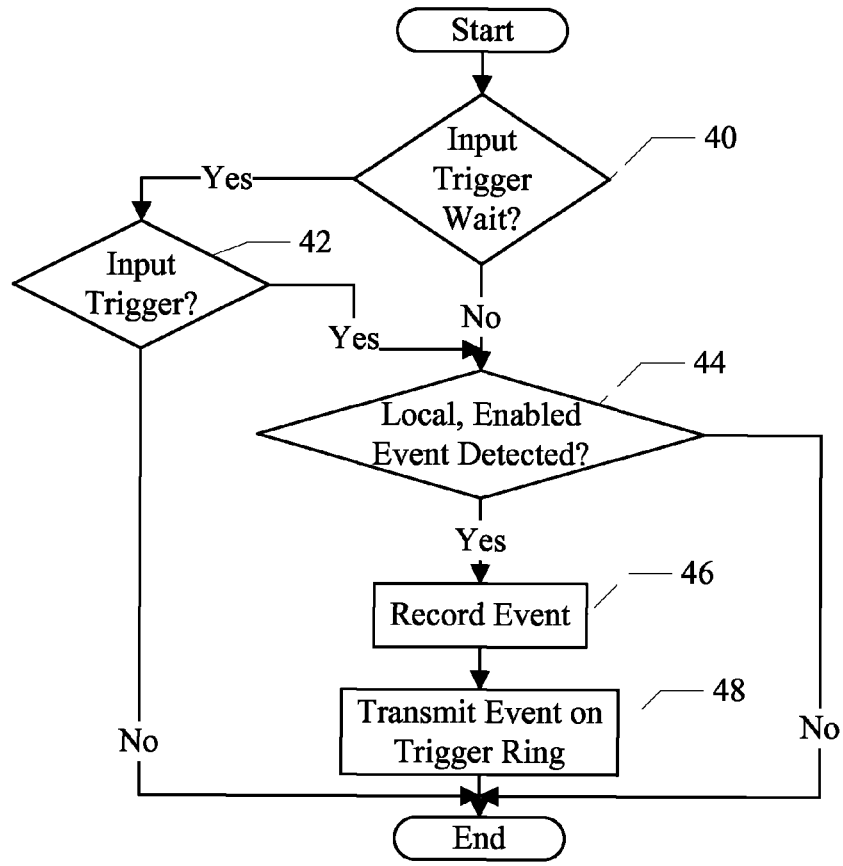
FIG. 3 is a flowchart illustrating operation of one embodiment of the local debug control unit shown in FIG. 2.

Turning now to FIG. 3, a flowchart is shown illustrating operation of one embodiment of the local debug control unit 18A. Other local debug control units 18B-18E may be similar. While the blocks are shown in a particular order for ease of understanding, other orders may be used. Blocks may be performed in parallel in combinatorial logic circuits in the local debug control unit 18A. Blocks, combinations of blocks, and/or the flowchart as a whole may be pipelined over multiple clock cycles. The local debug control unit 18A (and/or the control circuit 30 and mux 34, in an embodiment) may be configured to implement the operation shown in FIG. 3.

As mentioned above, the local debug control unit 18A may be programmed to begin monitoring for a local event in response to an input trigger event. If the local debug control unit 18A has been programmed to wait for an input event (decision block 40, "yes" leg) and the input trigger has not occurred yet (decision block 42, "no" leg), the local debug control unit 18A may be idle. If the local debug control unit 18A has been programmed to wait for an input event (decision block 40, "yes" leg) and the input trigger has occurred (decision block 42, "yes" leg), or the local debug control unit 18A has not been programmed to wait for an input event (decision block 40, "no" leg), the local debug control unit 18A may begin monitoring for local, enabled events (i.e. events that have been enabled via programming in the debug control register 32).

If the local debug control unit 18A detects a local, enabled event (decision 44, "yes" leg), the local debug control unit 18A may be configured to record the event (block 46), and to transmit an indication of the detected event on the trigger ring 16 (block 48). The local debug control unit 18A may be configured to record the event in the debug control register 32 or another software-visible register, for example. The local debug control unit 18A may be configured to transmit the indication of the detected event on the assigned channel of the trigger ring 16.

It is noted that the local debug control units 18A-18E may be programmed to detect multiple events. The local debug control units 18A-18E may include circuitry to implement the operation of the flowchart of FIG. 3 in parallel for each enabled event. Additionally, a local debug control unit 18A-18E may be programmed to detect a combination of events. In such a case, the decision block 44 may refer to detect the combination of local, enabled events.

Figure 4:
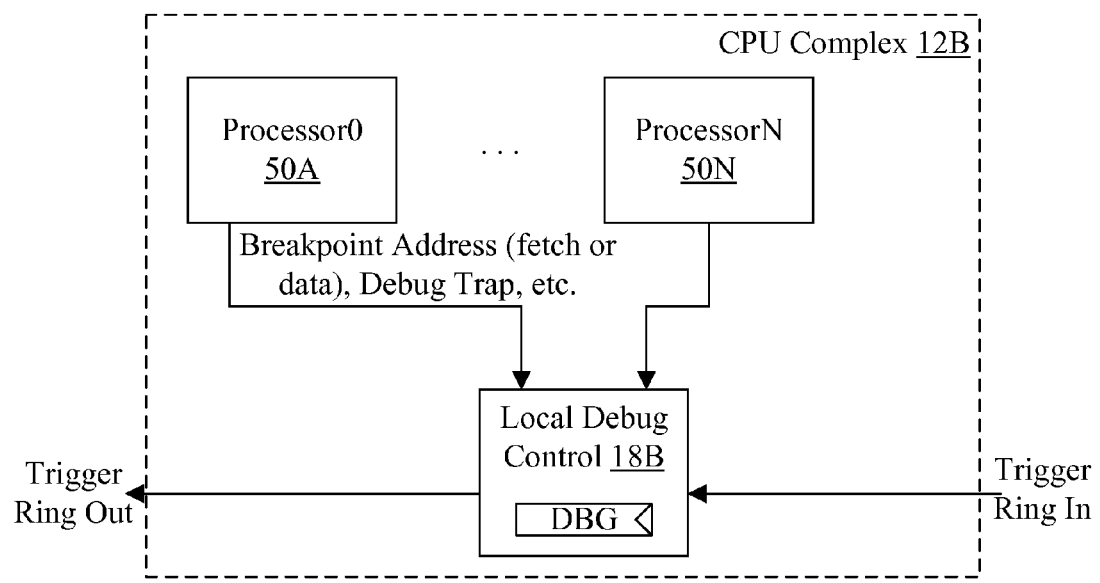
FIG. 4 is a block diagram of one embodiment of a central processing unit (CPU) complex shown in FIG. 1.

Turning next to FIG. 4, a block diagram of one embodiment of the CPU complex 12B is shown. In the illustrated embodiment, the CPU complex 12B includes one or more processors (e.g. processors 50A-50N in FIG. 4). The CPU complex 12B may further include related circuitry such as caches that are external to the processors 50A-50N, an interface unit to interface to other parts of the SOC 10, etc. The processors 50A-50N may have internal caches that are private to the processors 50A-50N, although they may be cache coherent with the external caches and memory. The CPU complex 12B further includes the local debug control unit 18B, as illustrated in FIG. 1, coupled to the trigger ring input and trigger ring output similar to the local debug control unit 18A shown in FIG. 2.

In this embodiment, the local debug control unit 18B is coupled to receive the debug events supported by the processors 50A-50N as local debug events. The processor debug events may include such events as breakpoint addresses (either fetch addresses used to fetch the instructions or data addresses accessed by load/store instructions or instructions having memory operations), debug traps, etc. In some embodiments, the processor debug events may be specified as part of the instruction set architecture (ISA) implemented by the processor. In other embodiments, the processor debug events may be implementation-specific and may vary from processor embodiment to processor embodiment. In still other embodiments, a combination of ISA-specified and implementation-specific processor debug events may be used.

Figure 5:
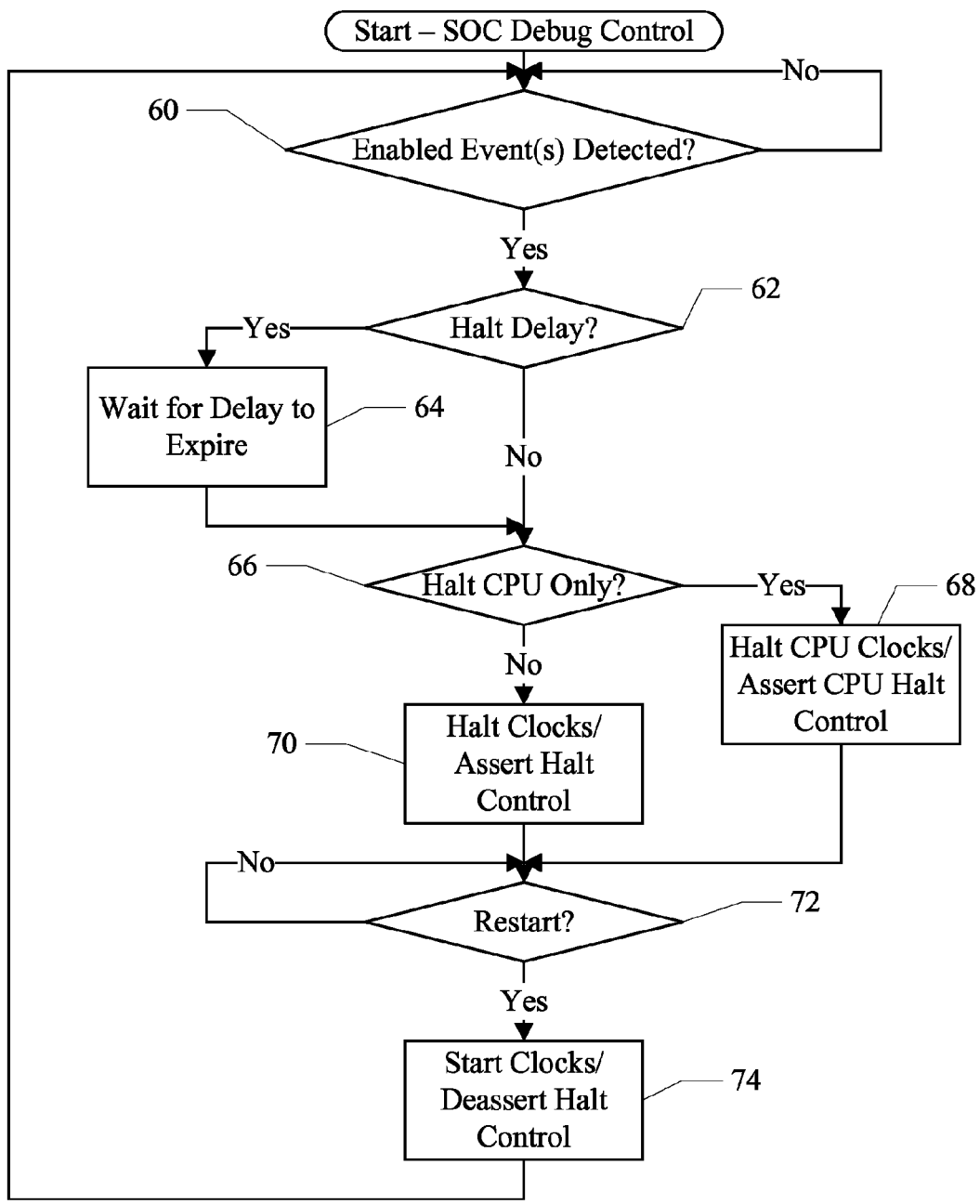
FIG. 5 is a flowchart illustrating operation of one embodiment of an SOC debug control unit shown in FIG. 1.

Turning now to FIG. 5, a flowchart is shown illustrating operation of one embodiment of the SOC debug control unit 14. While the blocks are shown in a particular order for ease of understanding, other orders may be used. Blocks may be performed in parallel in combinatorial logic circuits in the SOC debug control unit 14. Blocks, combinations of blocks, and/or the flowchart as a whole may be pipelined over multiple clock cycles. The SOC debug control unit 14 may be configured to implement the operation shown in FIG. 5.

The SOC debug control unit 14 may be configured to monitor the trigger ring 16 to detect enabled debug events (decision block 60). For example, in an embodiment, the SOC debug control unit 14 may be programmable to monitor one or more trigger ring channels, and the SOC debug control unit 14 may be configured to monitor the enabled channels for assertion of a signal indicating a debug event. Alternatively, the SOC debug control unit 14 may be programmable with identifiers for the enabled debug events, and the SOC debug control unit 14 may monitor the trigger ring 16 (or enabled channels on the trigger ring) for the enabled identifiers.

Responsive to detection of an enabled debug event (decision block 60, "yes" leg), the SOC debug control unit 14 may be configured to determine if a delay from the event is enabled before halting the SOC 10 (decision block 62). For example, the delay may be enabled in the DBG register in the SOC debug control unit 14, and the amount of delay may be programmed into the DBG register also. Alternatively, other registers may be used for the enable and/or the delay amount. If so (decision block 62, "yes" leg), the SOC debug control unit 14 may be configured to enable a delay monitor and wait for the delay to expire (block 64). In this embodiment, the SOC debug control unit 14 may be programmable to halt only the CPU in response to one or more debug events (rather than entire SOC 10). If the SOC debug control unit 14 is programmed to halt only the CPU (decision block 66, "yes" leg), the SOC debug control unit 14 may be configured to halt the CPU clocks to the CPU complex 12B (block 68). Alternatively, the processors in the CPU complex 12B may support a halt input and the SOC debug control unit 14 may be configured to assert the halt input. The clocks to the remaining IP blocks 12A and 12C-12E may remaining running (and any supported halt inputs to the remaining IP blocks may remain deasserted). On the other hand, if the SOC debug control unit 14 is programmed to halt the SOC (decision block 66, "no" leg), the SOC debug control unit 14 may be configured to halt the clocks to the IP blocks 12A-12E (block 70). Alternatively, for those IP blocks 12A-12E that support a halt input, the SOC debug control unit 14 may be configured to assert the halt input.

In an embodiment, the SOC 10 may be configured to restart after halting. In such an embodiment, the SOC debug control unit 14 may await a restart command (e.g. from a debugger). If the restart command is received (decision block 72, "yes" leg), the SOC debug control unit 14 may be configured to start the stopped clocks to the IP blocks 12A-12E and/or deassert the halt inputs to the IP blocks 12A-12E. The flowchart may return to the decision block 60 and the SOC debug control unit 14 may be monitoring for enabled debug events. The restart command may be communicated to the SOC debug control unit 14 in a variety of fashions. For example, the debugger may write a control bit/field in the DBG register of the SOC debug control unit 14 to indicate the restart command. The restart command may be communicated over a debug port of the SOC 10, to which the SOC debug control unit 14 may be coupled.

Figure 6:
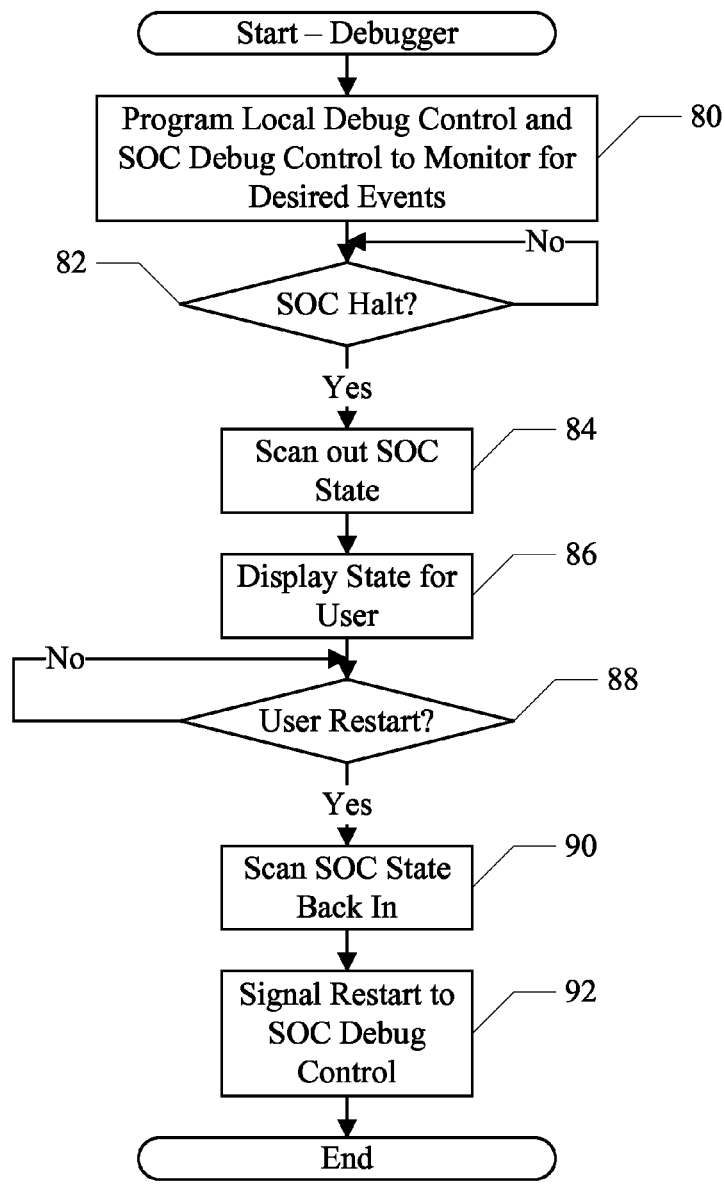
FIG. 6 is a flowchart illustrating operation of one embodiment of a debugger.

Turning now to FIG. 6, a flowchart is shown illustrating operation of one embodiment of a debugger. The debugger may include a combination of hardware configured to interface to a system including the SOC 10 and software executable on a system separate from the system including the SOC 10. While the blocks are shown in a particular order for ease of understanding, other orders may be used. The debugger may be configured to implement the operation shown in FIG. 6.

The debugger may be configured to program the local debug control units 18A-18E and the SOC debug control unit 14 to monitor for the desired debug events (block 80). The programming may include enabling the desired debug events in the local debug control units 18A-18E, assigning debug events to trigger ring channels, etc. The debugger may release the system including the SOC 10 to execute, and may await an SOC halt (decision block 82). In some embodiments, the SOC debug control unit 14 may signal the debugger when the SOC halt has occurred. Alternatively, the halt may be recorded in a register (e.g. the DBG register in the SOC debug control unit 14), and the debugger may poll the register to detect the halt. In response to detecting the halt (decision block 82, "yes" leg), the debugger may scan out the SOC state (block 84). The debugger may scan out only the SOC state that the user desires, or may scan out all of the SOC state, in various embodiments. The debugger may display the state for the user (block 86). The user may analyze the state, and may eventually decide that the system is to restart (e.g. at the point at which the halt occurred). In such embodiments, the debugger may await a command to restart (decision block 88). Responsive to receiving the user restart command (decision block 88, "yes" leg), the debugger may scan the SOC state back into the SOC (block 90). For example, the debugger may have stored the SOC state in the memory/disk storage of the computer system on which the debugger is executing. The Debugger may read the state and transmit the state back into the SOC using the scan chains. The debugger may signal restart to the SOC debug control unit 14 (block 92), which may release the halt of the SOC (e.g. deasserting the halt input, restarting the clocks, etc.).

Figure 7:
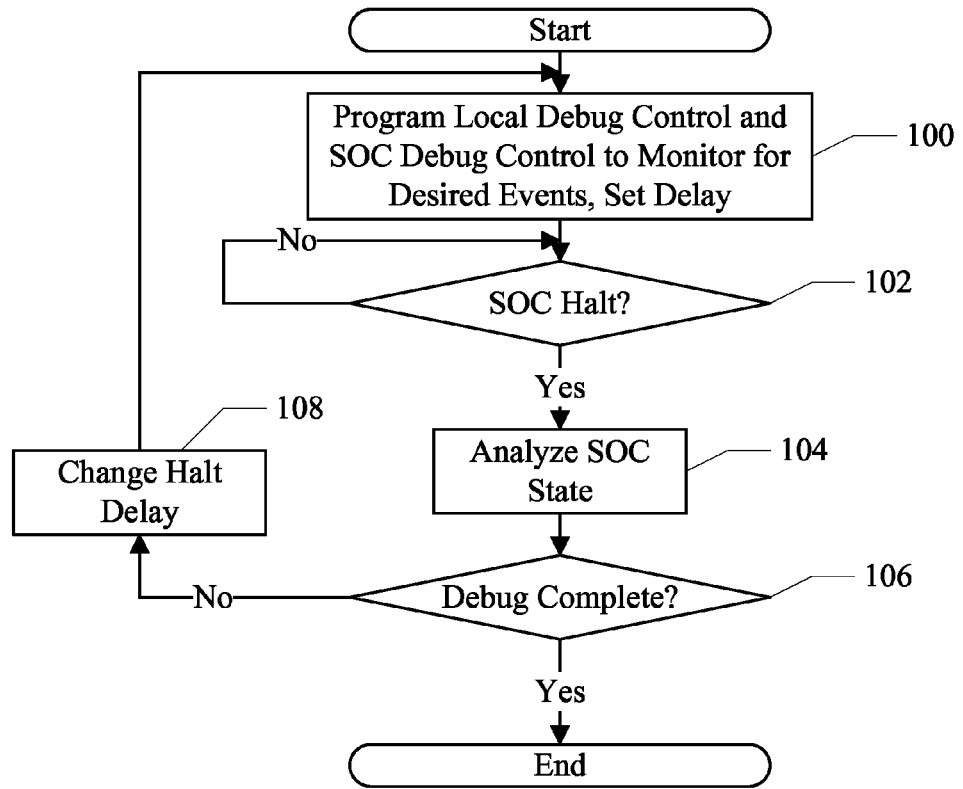
FIG. 7 is a flowchart illustrating one embodiment of a debug method using the debugger and SOC debug features.

FIG. 7 is a flowchart illustrating an embodiment of a debug method using the debugger and SOC halt functionality described above. The method shown in FIG. 7 may be used to repeatedly halt the SOC with different delays, allowing a fine grain view of the SOC state in the clock cycles surrounding an event of interest to the user. Using the debugger, the user may program the local debug control units 18A-18E and the SOC debug control unit 14 to monitor for the event(s) of interest (block 100). Additionally, the user may program a desired halt delay in the SOC debug control unit 14. The system may be started, and an SOC halt may be awaited. When the SOC halt occurs (decision block 102, "yes" leg) and the SOC state has been scanned out and displayed for the user, the user may analyze the SOC state (block 104). If the user has not yet completed debugging (decision block 106, "yes" leg), the user may select a new halt delay to capture additional SOC state (block 108), and the debugger may program the SOC 10 to execute again (block 100). The SOC may be reset, if needed, before programming the SOC 10 to execute again. By repeating the method of FIG. 7 at various delays that are near each other, the fine grain view of the SOC state near a failure or other point of interest may be realized.

In some embodiments, the SOC 10 may support restarting and a similar method to that of FIG. 7 may be used to restart the SOC 10 to run for a small number of additional cycles and scan out the SOC state again.

Figure 8:
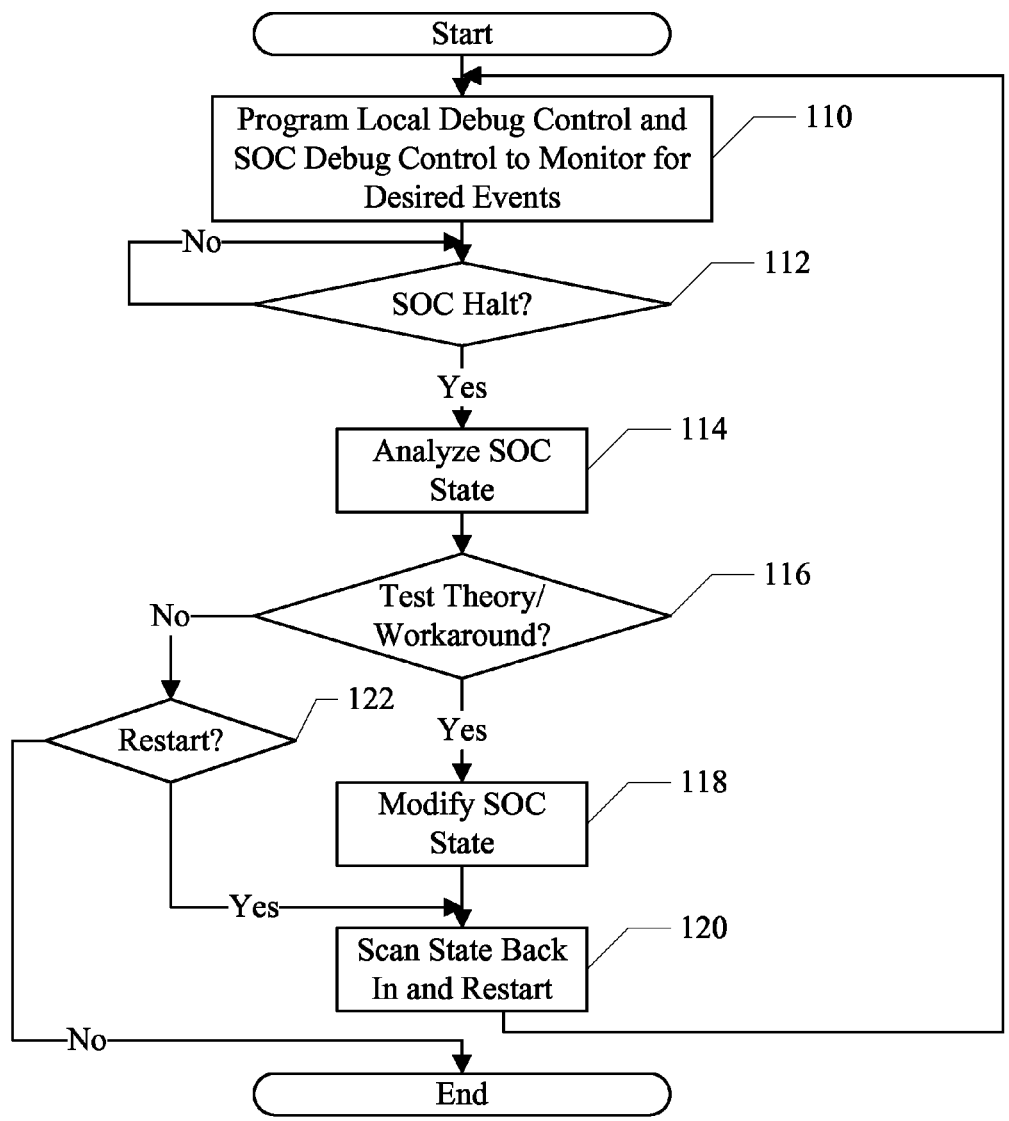
FIG. 8 is a flowchart illustrating another embodiment of a debug method using the debugger and SOC debug features.

FIG. 8 is a flowchart illustrating another embodiment of a debug method using the debugger and SOC halt functionality described above. Similar to the method of FIG. 7, the user may program the local debug control units 18A-18E and the SOC debug control unit 14 to monitor for the event(s) of interest (block 110). The halt delay may or may not be used, as desired. When the SOC halt occurs (decision block 112, "yes" leg) and the SOC state has been scanned out and displayed for the user, the user may analyze the SOC state (block 114).

Based on the analysis of the SOC state, the user may develop a theory as to what is causing the bug. Similarly, once the bug is identified, a workaround to avoid hitting the bug may be devised by the user (particularly for cases in which the root cause of the bug is a hardware issue, which may not be resolved until the next revision of the hardware is available). It may be possible for the user to modify the SOC state to test the theory or the workaround. If so (decision block 116, "yes" leg), the user may modify the SOC state stored on the system that is executing the debugger (block 118). The debugger may scan the modified SOC state back into the SOC and may restart the system (block 120). Alternatively, the user may not have a theory/workaround to test (decision block 116, "no" leg), but may still wish to restart the system (decision block 122, "yes" leg). In such a case, the unmodified SOC state may be scanned back into the SOC and restarted (block 120).

Figure 9:
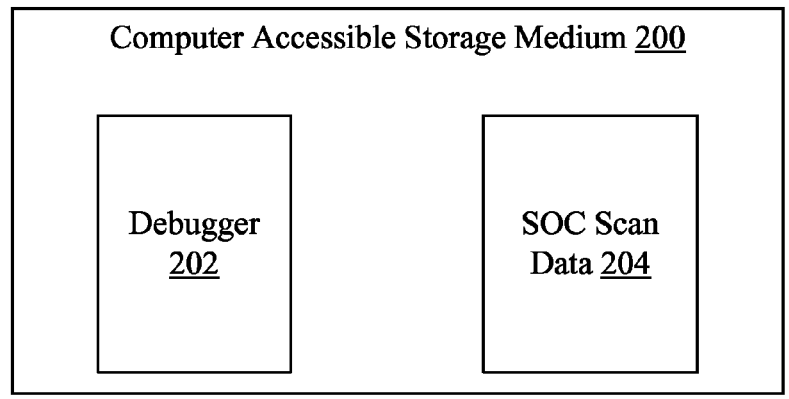
FIG. 9 is a block diagram of one embodiment a computer accessible storage medium.

Turning now to FIG. 9, a block diagram of a computer accessible storage medium 200 is shown. Generally speaking, a computer accessible storage medium may include any storage media accessible by a computer during use to provide instructions and/or data to the computer. For example, a computer accessible storage medium may include storage media such as magnetic or optical media, e.g., disk (fixed or removable), tape, CD-ROM, DVD-ROM, CD-R, CD-RW, DVD-R, DVD-RW, or Blu-Ray. Storage media may further include volatile or non-volatile memory media such as RAM (e.g. synchronous dynamic RAM (SDRAM), Rambus DRAM (RDRAM), static RAM (SRAM), etc.), ROM, or Flash memory. Storage media may also include non-volatile memory (e.g. Flash memory) accessible via a peripheral interface such as the Universal Serial Bus (USB) interface, a flash memory interface (FMI), a serial peripheral interface (SPI), etc. Storage media may include microelectromechanical systems (MEMS), as well as storage media accessible via a communication medium such as a network and/or a wireless link.

The computer accessible storage medium 200 in FIG. 9 may store one or more of a debugger 202 and SOC scan data 204. The debugger 202 may include the software portion of the debugger described above. The debugger 202 may include instructions which, when executed, implement the operation described above for the debugger. The SOC scan data 204 may be the data scanned from the SOC 10. The SOC scan data 204 may also be the modified (or unmodified) scan data to be scanned back into the SOC 10. A carrier medium may include computer accessible storage media as well as transmission media such as wired or wireless transmission.

Figure 10:
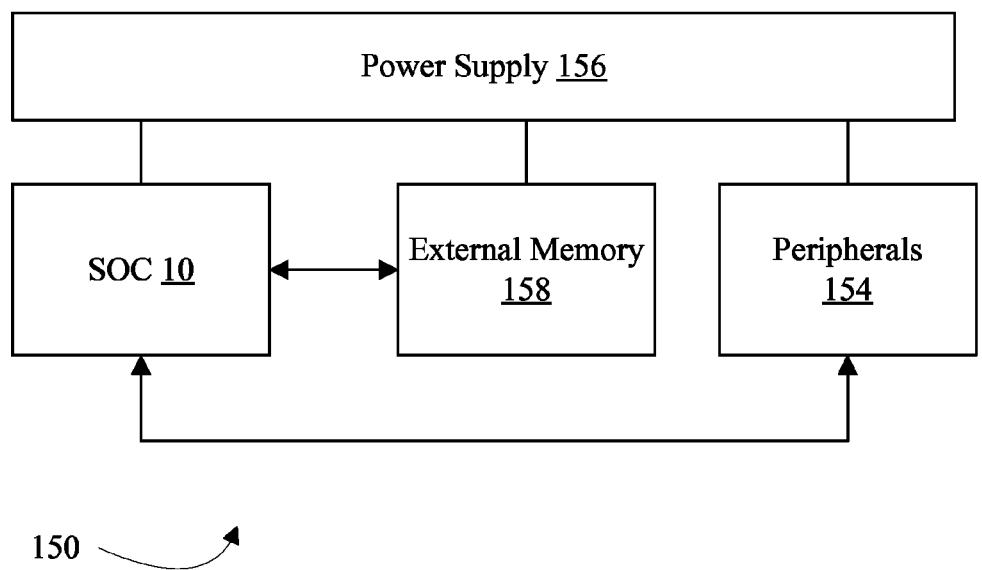
FIG. 10 is a block diagram of one embodiment of a system including the SOC shown in FIG. 1.

Turning now to FIG. 10, a block diagram of one embodiment of a system 150 is shown. In the illustrated embodiment, the system 150 includes at least one instance of the SOC 10 (from FIG. 1) coupled to one or more peripherals 154 and an external memory 158. A power supply 156 is also provided which supplies the supply voltages to the SOC 10 as well as one or more supply voltages to the memory 158 and/or the peripherals 154. In some embodiments, more than one instance of the SOC 10 may be included (and more than one external memory 158 may be included as well).

The peripherals 154 may include any desired circuitry, depending on the type of system 150. For example, in one embodiment, the system 150 may be a mobile device (e.g.

personal digital assistant (PDA), smart phone, etc.) and the peripherals 154 may include devices for various types of wireless communication, such as wifi, Bluetooth, cellular, global positioning system, etc. The peripherals 154 may also include additional storage, including RAM storage, solid state storage, or disk storage. The peripherals 154 may include user interface devices such as a display screen, including touch display screens or multitouch display screens, keyboard or other input devices, microphones, speakers, etc. In other embodiments, the system 150 may be any type of computing system (e.g. desktop personal computer, laptop, workstation, net top etc.).

The external memory 158 may include any type of memory. For example, the external memory 158 may be SRAM, dynamic RAM (DRAM) such as synchronous DRAM (SDRAM), double data rate (DDR, DDR2, DDR3, etc.) SDRAM, RAMBUS DRAM, etc. The external memory 158 may include one or more memory modules to which the memory devices are mounted, such as single inline memory modules (SIMMs), dual inline memory modules (DIMMs), etc. Alternatively, the external memory 158 may include one or more memory devices that are mounted on the SOC 10 in a chip-on-chip or package-on-package implementation.

Numerous variations and modifications will become apparent to those skilled in the art once the above disclosure is fully appreciated. It is intended that the following claims be interpreted to embrace all such variations and modifications.

What is claimed is:

1. An integrated circuit comprising:
a central processing unit (CPU) complex comprising one or more processors;
one or more component blocks coupled to the CPU complex, wherein the one or more component blocks are configured to implement one or more operational features of the integrated circuit other than a CPU feature;
a plurality of local debug control units, wherein one of the plurality of local debug control units is included in the CPU complex and each other one of the plurality of local debug control units is included in a respective one of the one or more component blocks, wherein the plurality of local debug control units are configured to monitor for debug events in the corresponding CPU complex or component block; and
a debug control unit coupled to the plurality of local debug control units in a ring, and wherein the plurality of local debug units are configured to transmit indications of detected debug events on the ring, and wherein a first local debug unit of the plurality of local debug units is coupled to receive an indication of a detected debug event from the ring and to trigger monitoring for another debug event responsive to receiving the indication of the detected debug event, and wherein the debug control unit is configured to monitor for detected debug events from the plurality of local debug control units, and wherein the debug control unit is configured to halt the CPU complex and the one or more component blocks responsive to detecting a specified one or more of the detected debug events.

2. The integrated circuit as recited in claim 1 wherein the debug control unit is configured to halt at least a subset of the CPU complex and the one or more component blocks by stopping clock inputs to the subset.

3. The integrated circuit as recited in claim 2 wherein the debug control unit is configured to halt a remaining subset of the CPU complex and the one or more component blocks by asserting a halt input to the remaining subset.

4. A method comprising:
monitoring for specified conditions in a plurality of IP blocks in an integrated circuit, wherein the plurality of IP blocks include at least one non-CPU block;
detecting one or more of the specified conditions in the plurality of IP blocks;
transmitting an indication of the detecting to a debug controller in the integrated circuit; and
responsive to the indication, the debug controller halting the plurality of IP blocks in the integrated circuit, wherein the debug controller is programmable to delay the halting by a programmable delay from receiving the indication.

5. The method as recited in claim 4 further comprising programming local debug controllers in each of the plurality of IP blocks to monitor for the specified conditions in the corresponding IP block.

6. The method as recited in claim 5 wherein each of the local debug controllers is configured to monitor for different conditions that are specific to the corresponding IP block.

7. The method as recited in claim 4 further comprising:
scanning out a state of the integrated circuit;
analyzing the state;
scanning the state back into the integrated circuit; and
resuming operation in the integrated circuit subsequent to scanning the state back into the integrated circuit.

8. The method as recited in claim 7 further comprising modifying the state between scanning out the state and scanning the state back in.

9. The method as recited in claim 8 wherein the modified state is generated responsive to a theory as to a cause for a failure during execution of software on the integrated circuit.

10. The method as recited in claim 8 wherein the modified state is generated responsive to a workaround to a bug in the integrated circuit, to test the workaround.

11. A method comprising:
monitoring for specified conditions in a plurality of component blocks in an integrated circuit, wherein the plurality of component blocks include a central processing unit (CPU) block and at least one non-CPU block;
detecting one or more of the specified conditions in the plurality of component blocks;
transmitting an indication of the detecting to a debug controller in the integrated circuit; and
responsive to the indication, the debug controller delaying for a programmable time and then halting the plurality of component blocks in the integrated circuit.

12. The method as recited in claim 11 further comprising iterating the monitoring, detecting, transmitting, and delaying with different programmable times.

13. The method as recited in claim 12 further comprising analyzing a state of the integrated circuit at each halt to determine a next programmable time for the delay.

14. The method as recited in claim 13 further comprising scanning out the state of the integrated circuit responsive to the halt.

15. The method as recited in claim 14 further comprising reinitializing the integrated circuit prior to each iteration.

16. A non-transitory computer accessible storage medium storing a plurality of instructions which, when executed:
program a plurality of local debug control units to monitor respective IP blocks of a system on a chip (SOC) for selected debug events, wherein the debug events that are detectable vary dependent on the functionality implemented by each IP block, and wherein at least one of the IP blocks is a central processing unit (CPU) complex including one or more processors and at least one other IP block is not a CPU complex;

program a delay in an SOC debug control unit that is coupled to the plurality of local debug control units, wherein the SOC debug control unit is coupled to receive an indication from the plurality of local debug control units that a selected debug event has been detected, and wherein the SOC debug control unit is configured to halt the SOC responsive to the detection of the selected debug event and further responsive to the delay expiring after the detection of the selected debug event;

detect that the SOC has halted responsive to detection of the selected debug events;

scan out a state of the SOC; and display the state of the SOC to a user.

17. The computer accessible storage medium as recited in claim 16 wherein the plurality of instructions, when executed:

modify the state of the SOC responsive to user input;

scan the modified state into the SOC; and start the SOC with the modified state.

18. An integrated circuit comprising:

a central processing unit (CPU) complex comprising one or more processors;

one or more component blocks coupled to the CPU complex, wherein the one or more component blocks are configured to implement one or more operational features of the integrated circuit other than a CPU feature; and a debug control unit coupled to the CPU complex and the one or more component blocks, wherein the debug control unit is configured to monitor for debug events in the CPU complex and the one or more component blocks, and wherein the debug control unit is configured to halt the CPU complex and the one or more component blocks responsive to detecting a specified one or more debug events, and wherein the debug control unit is programmable with a delay from the detection of the specified one or more debug events, and wherein the debug control unit is configured to halt the CPU complex and the one or more component blocks responsive to the expiration of the delay.

19. The integrated circuit as recited in claim 18 wherein each of the one or more component blocks comprises a local debug control unit configured to monitor for debug events in the component block and to transmit indications of detected, specified debug events in the component block to the debug control unit.

20. The integrated circuit as recited in claim 19 wherein the CPU complex comprises a local debug control unit configured to monitor for debug events in the CPU complex and to transmit indications of detected, specified debug events in the CPU complex to the debug control unit.

21. The integrated circuit as recited in claim 20 wherein the CPU complex, the one or more component blocks, and the debug control unit are coupled in a ring and the indications of the detected, specified debug events are transmitted over the ring to the debug control unit.

22. The integrated circuit as recited in claim 21 wherein a first local debug control unit is configured to receive the indications of the detected, specified debug events from a second local debug control unit and is configured to trigger monitoring for another specified debug event within the CPU complex or component block that includes the second local debug control unit responsive to receiving the indications of the detected, specified debug events.

23. The integrated circuit as recited in claim 18 wherein the debug control unit is configured to halt at least a subset of the CPU complex and the one or more component blocks by stopping clock inputs to the subset.

24. The integrated circuit as recited in claim 23 wherein the debug control unit is configured to halt a remaining subset of the CPU complex and the one or more component blocks by asserting a halt input to the remaining subset.

25. In an integrated circuit comprising a central processing unit (CPU) complex comprising one or more processors; one or more component blocks coupled to the CPU complex, wherein the one or more component blocks are configured to implement one or more operational features of the integrated circuit other than the CPU feature; a plurality of local debug control units, wherein one of the plurality of local debug control units is included in the CPU complex and each other one of the plurality of local debug control units is included in a respective one of the one or more component blocks; and a debug control unit coupled to the plurality of local debug control units in a ring; a method comprising:

monitoring for debug events in the corresponding CPU complex or component block by the plurality of local debug control units;

detecting, in a first local debug unit of the plurality of debug units, a first debug event;

transmitting, by the first local debug unit, an indication of the first debug event on the ring;

receiving, in a second debug unit, the indication of the first debug event; and triggering, in the second debug unit, monitoring for a second debug event responsive to receiving the indication of the first debug event.

26. The method as recited in claim 25 further comprising the debug control unit halting the CPU complex and the one or more component blocks responsive to detection of a specified debug event.

27. The method as recited in claim 26 wherein the halting comprises halting at least a subset of the CPU complex and the one or more component blocks by stopping clock inputs to the subset.

28. The method as recited in claim 27 wherein the halting comprises halting a remaining subset of the CPU complex and the one or more component blocks by asserting a halt input to the remaining subset.

* * * * *